United States Patent [19]
Brieten

[11] 3,888,137
[45] June 10, 1975

[54] DIFFERENTIAL DRIVE MECHANISM
[76] Inventor: Charles Henry Brieten, 330 W. Mulberry, Fredericksburg, Tex. 78624
[22] Filed: Feb. 25, 1974
[21] Appl. No.: 445,455

[52] U.S. Cl. .................... 74/650; 192/45; 74/711
[51] Int. Cl. ..... F16h 35/04; F16h 1/44; F16d 15/00
[58] Field of Search .......... 74/650, 711; 192/44, 45

[56] References Cited
UNITED STATES PATENTS

| | | | |
|---|---|---|---|
| 1,390,641 | 9/1921 | Richardson | 74/650 |
| 2,638,795 | 5/1953 | King | 74/650 |
| 2,700,310 | 1/1955 | Viebrock et al. | 74/650 |
| 2,966,075 | 12/1960 | Howich | 74/650 |
| 3,173,309 | 3/1965 | Seliger | 74/650 |
| 3,581,597 | 6/1971 | Reirsgaard | 192/44 X |

FOREIGN PATENTS OR APPLICATIONS

| | | | |
|---|---|---|---|
| 422,067 | 1/1935 | United Kingdom | 192/45 |
| 227,401 | 9/1943 | Switzerland | 192/45 |

Primary Examiner—Samuel Scott
Assistant Examiner—P. S. Lall
Attorney, Agent, or Firm—Willard J. Hodges, Jr.

[57] ABSTRACT

A differential power transmitting device for wheel vehicle transmitting power from a ring gear to a drive cylinder encasing rollers contacting and driving a first and second drive cam attached to each half of a split axle. The device is limited slip in function, retarding variations of rate of rotation of the two wheels. The drive cams rotate closely adjacent the interior surface of the drive cylinder, drive roller support disc position sets of drive rollers in the area formed by the peaks of the drive cam lobes and the valleys. An overrunning wheel through the rollers and a drive cam apply rotor motion to the drive cylinder. In a normal power transmitting function the drive cam lobes squeezing engage the drive rollers between the drive surface of a cam lobe, and the drive cylinder rotating the wheels of the vehicles.

7 Claims, 8 Drawing Figures

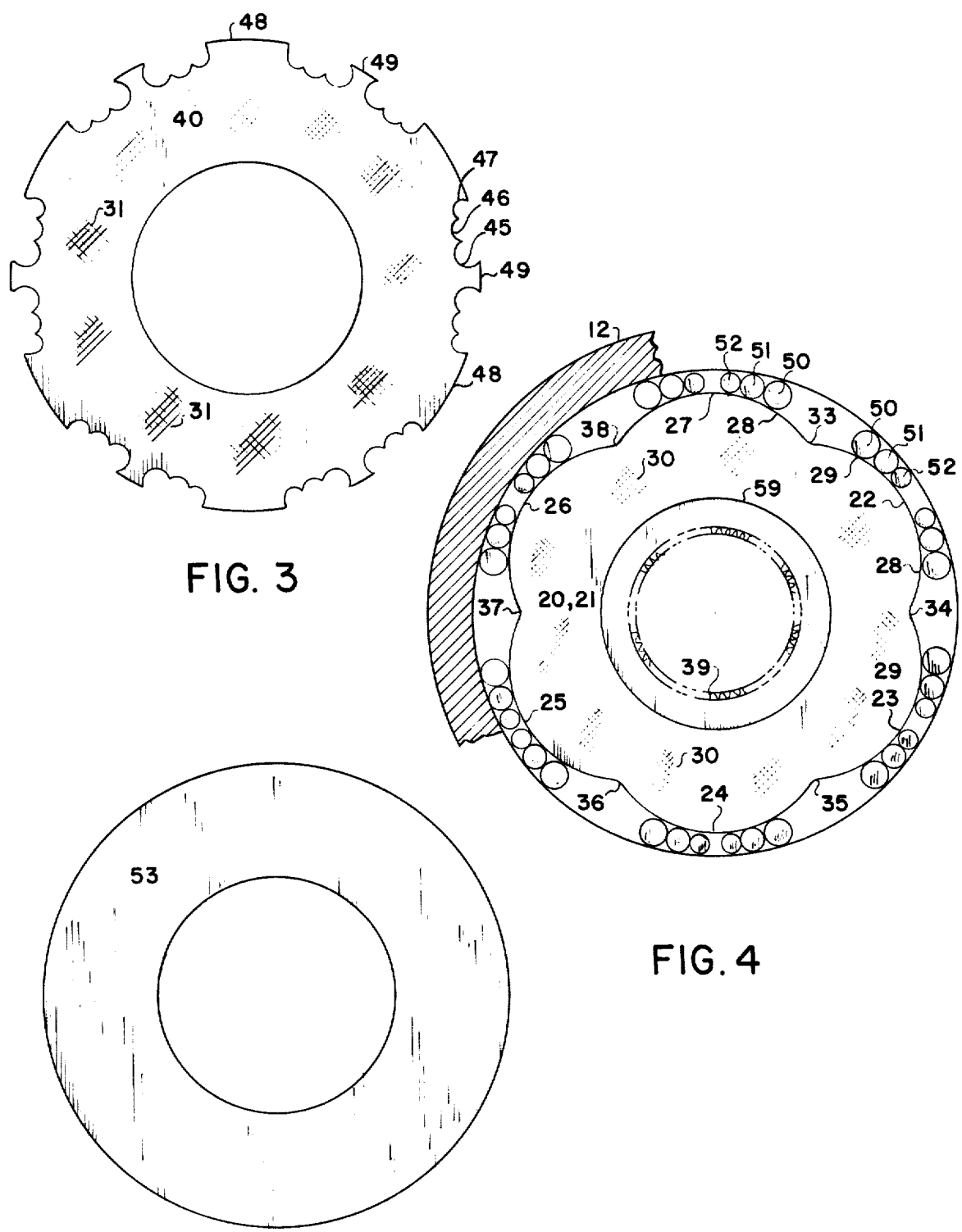

3,888,137

DIFFERENTIAL DRIVE MECHANISM

BACKGROUND OF THE INVENTION

1. Field of the Invention

This invention pertains to a differential receiving rotary motion from a driven ring gear transmitting rotary motion through a drive cylinder, multiple drive rollers and two drive cams rotating wheels through split axles splined to the drive cams. The device tends to be limited slip in function and drive the pair of wheels at equal rates of rotation.

2. Description of Prior Art

Devices of related modes of operation have been previously patented, such as U.S. Pat. No. 2,700,310 employing cam-like surfaces and plungers; U.S. Pat. No. 2,966,075 employing rollers engaging an exterior cam; and U.S. Pat. No. 3,173,309 also employing rollers engaging an exterior cam. The more conventional differential most widely used employs caged planetary gears driving a split axle; such a mechanism tends to apply torque to the fastest turning wheel such as the spinning wheel on a slick surface. Clutch-like braking devices are incorporated in limited slip differentials in the well known conventional configurations.

SUMMARY OF THE INVENTION

This invention was conceived and developed in a desire to accomplish a limited slip drive of two wheels in limited space with high torque efficiency. The device was fitted into a conventional differential housing and tested. A standard pinion gear drove a ring gear driving the split axle through the device of this invention. The ring gear rotated a drive cylinder encasing a first and second multiple lobed drive cams which are splined to the respective shafts of the two wheels. Drive rollers graduated in size are retained in operable position by drive roller support disc in the space between the peaks of the cam lobes and the drive cam valleys. The arrangement and dimensions of the components tend to rotate each drive cam at a consistent rate of rotation with the drive cylinder. Overrun motion as well as drive motion tends to cause the drive rollers to ride up on either the drive surface or the overrun surface of the drive cams wedgingly engaging the drive rollers between the drive cylinder and the drive cams frictionally encouraging all components to rotate at a consistent rate.

BRIEF DESCRIPTION OF THE DRAWINGS

For a graphic illustration of the device attention is invited to the attached several views wherein identical reference characters refer to identical or equivalent components throughout the several views, and the following detailed description.

FIG. 3 is a plan view of one of the four identical drive rollers support discs taken substantially on line 3—3 of FIG. 1 looking in the direction of the arrows.

FIG. 4 is a partially fragmented view of one of the two identical drive cams taken substantially on line 4—4 of FIG. 1 looking in the direction of the arrows.

FIG. 4 also illustrates the relative position of the drive cylinder, the drive rollers and the drive cams.

FIG. 5 is a plan view of one of the five spacer discs taken substantially on line 5—5 of FIG. 1 looking in the direction of the arrows.

DESCRIPTION OF THE PREFERRED EMBODIMENT

Figure 8:
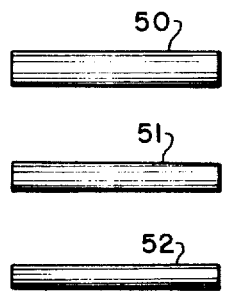
FIG. 8 is a fragmented view of a set of three drive rollers illustrating their relative graduated proportional dimensions.

For an illustration of the mode of construction and operation of the preferred embodiment reference is made to the attached drawings and the following detailed description. For an illustration of the construction and arrangement and assembly of the device attention is particularly invited to FIG. 1 For a detail of the configuration of various components attention is particularly invited to FIGS. 2–6. For further detail of the construction, assembly and operation of the drive cams, roller support discs, and drive rollers, attention is invented to FIGS. 7 and 8.

The device of the preferred embodiment was constructed employing a ring gear (not shown) from an existing differential of conventional configuration. Ring gear (not shown) was attached to a ring gear disc 11 which was modified to receive drive cylinder 12 of this development. The drive cylinder 12 was constructed from high quality, high carbon steel tubing. The prototype was manufactured from an oil well drill stem collar, and was constructed 4½inches long with an outside diameter of 5 inch and an inside diameter of 3⅞inches. Four equally spaced lubricating passages 32 were drilled in the cylinder 12 at an angle to admit lubrication to the interior of the unit. A cap groove 14 was formed by a step cut three-fourth inch deep in one end of cylinder 12 to receive drive cylinder cap 13. Ring gear disc 11 and drive cylinder cap 13 of the prototype were constructed from portions of two standard differential spider cages. Drive cylinder cap 13 is machined to fit snugly in cap groove 14 in the end of drive cylinder 12. Drive bearing 15 is of conventional construction and is mounted on ring gear drive bearing shaft 16. Both the interior of ring gear disc 11 and drive cylinder cap 13 were constructed with three spacer disc bearings 17. These bearings are spring loaded and positioned in detents formed in cylinder 12 and cap 13. Spacer disc bearings 17 were formed by drilling seven-thirtyseconds inch holes nine-sixteenth inch deep and mounting spring loaded seven-sixteenth inch ball bearings into the holes and shrinking the opening to retain the bearings 17. The center of each of the components must be constructed with an aperture of sufficient diameter to admit a spline half axle (not shown) which drives a wheel (not shown). In ring gear disc 11 is constructed ring gear stud holes 19 to which is secured ring gear (not shown). Mounted in drive cylinder 12 is first drive cam 20 splined to one-half axle and second drive cam 21 splined to the second one-half axle. These cams 20 and 21 of the preferred embodiment were machined from best quality of high carbon steel. The drive cams are of identical configuration. Drive cams were constructed 1 1/16 inches thick. The general configuration of the drive cam is arrived at by scribing a 1 inch circle in the center dividing it into six equal parts. A 3 inches circles was also scribed from the center. The cam lobes were generally arrived at by scribing an arc 1 1/4 inches in radius from the six equal division lines on the 1 inch diameter circle. THe cam lobes terminate at the point they contact the circumference of the circle having the 3 inches diameter. The cam was then machined to the desired configuration and heat treated and tempered to the desired hardness for durability.

For the general construction and configuration of the cams 20 and 21 attention is particularly invited to FIG. 4. The device is constructed with first drive cam lobe 22, second drive cam lobe 23, a third drive cam lobe 24, a fourth drive cam lobe 25, a fifth drive cam lobe 26, and a sixth drive cam lobe 27. The surfaces of these respective lobes are further designated as drive surface 28 and an overrun surface 29. Improved operation of these cams was obtained by constructing a drive cam serrated surface 30 on each end of the drive cams 20 and 21. Further illustrating the configuration of the cams 20 and 21 the outer surface is defined as a first drive cam valley 33, a second drive cam valley 34, a third drive cam valley 35, a fourth drive cam valley 36, a fifth drive cam valley 37, and a sixth drive cam valley 38. As previously described the area between the six cam lobes and six cam valleys comprises drive surfaces 28 and overrun surfaces 29. The centers of the cams are constructed with axle splines 39 compatible with splined half axles (not shown). Four drive roller support discs 40 were constructed from high quality three-sixteenth inch steel plate. The configuration of drive roller support disc 40 is of necessity compatible with the outer diameters of drive cams 20 and 21. A surface of the drive roller support disc 40 was serrated 31 to contact drive cam serrated surface 30 to encourage co-ordinated rotation. Drive roller support discs are constructed 3 7/8 inches diameter with a 1 57/64 inches opening at their center. The circumference of this material is divided into six equal parts. Four of these drive rollers support discs 40 were utilized in the completed device. These are designated as first drive roller support disc 41, second drive roller support disc 42, third drive roller support disc 43, and fourth drive roller support disc 44. The circumference of drive roller support disc is divided into six equal segments. On the center line for each of these segments is constructed a series of large roller support arcs 45, intermediate roller support arcs 46, and small roller support arcs 47. Each of these series of arcs are separated by cam peak spacers 48 or valley spacers 49. The larger spacers illustrated are the cam peak spacers 46 and the narrow spacers or the valley spacers 49. Relative dimensions of these constructions were accomplished by drilling a series of adjacent holes on arc of a circle having a 2 inches diameter. From a center line of valley spacer 49 a seven-thirtysecond inch hole was drilled five-sixtyfourth inch from the center line of the valley spacer 49, one-thirtysecond inch inside the outer circumference of the drive rollers support discs 40. An intermediate hole with a diameter of six-thirtysecond inch was drilled one-thirtysecond inch in from the circumference of drive roller support disc one-sixthfourth inch from the seven-thirtysecond inch hole and a third hole five-thirtysecond inch in diameter was drilled clearing the second hole by one-sixthfourth inch and again one-thirtysecond inch in from the circumference of drive roller support disc 40. This construction results in a final configuration substantially illustrated in FIG. 3. The large roller support arcs 45 of a seven-thirtysecond inch diameter are equally spaced on each side of valley spacer 49. Intermediate roller support arc 46 of a six-thirtysecond diameter clears the seven-thirtysecond diameter by one-sixthfourth inch, and the small roller support arc 47 constructed on a five-thirtysecond inch diameter clears the six-thirtysecond inch diameter by one-sixthfourth inch. This construction process is repeated on each side of the six lines projecting through the six valley spacers 49. After this series of drillings adjacent the circumference of drive roller support disc the remaining materials are removed and the surface is smoothed to give substantially the configuration illustrated in FIG. 3. In the resulting construction valley spacers 49 were approximately one-eighth inch wide, and the cam peak spacers 48 were approximately nine-sixteenth inch wide. The foregoing dimensions are relative and operated satisfactorily in a prototype model. Tolerance might well be varied within the concept of this invention.

Figure 1:
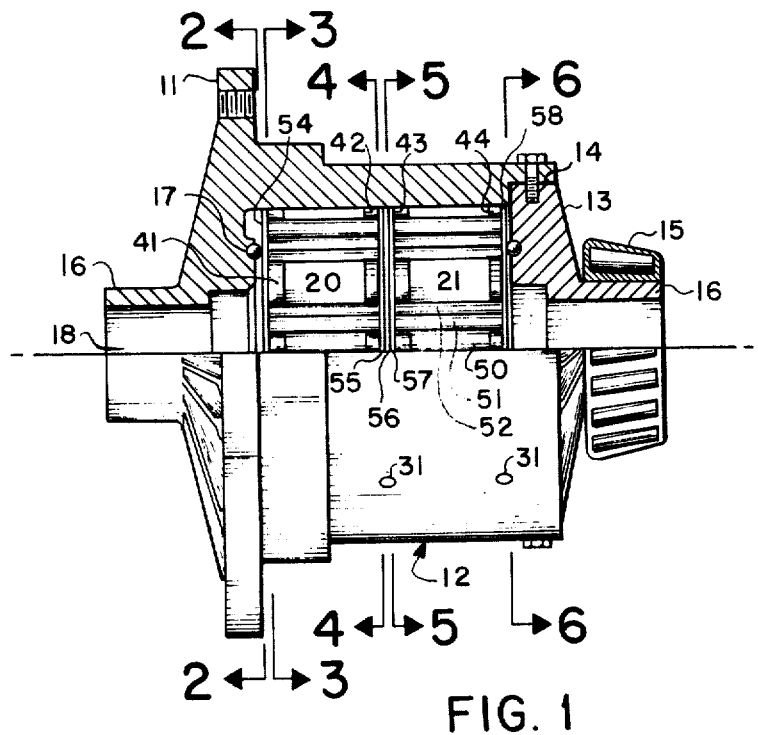
FIG. 1 is a partial sectional view of the assembled device illustrating the relative arrangement of the components in the operable position.
Figure 2:
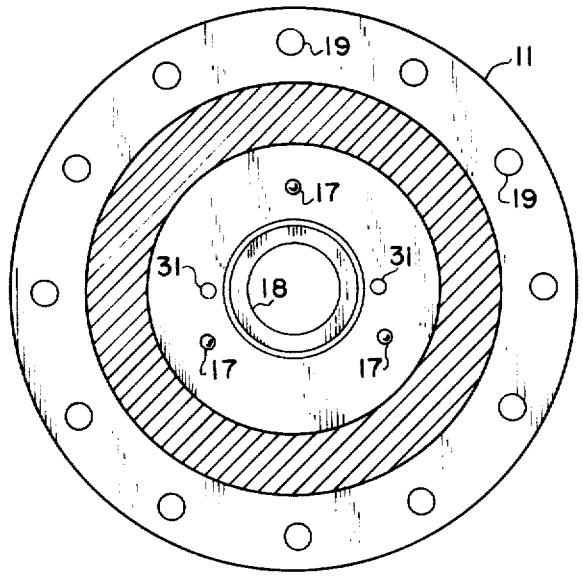
FIG. 2 is a fragmented plan interior view of the ring gear disc taken substantially on line 2—2 of FIG. 1 looking in the direction of the arrows.
Figure 6:
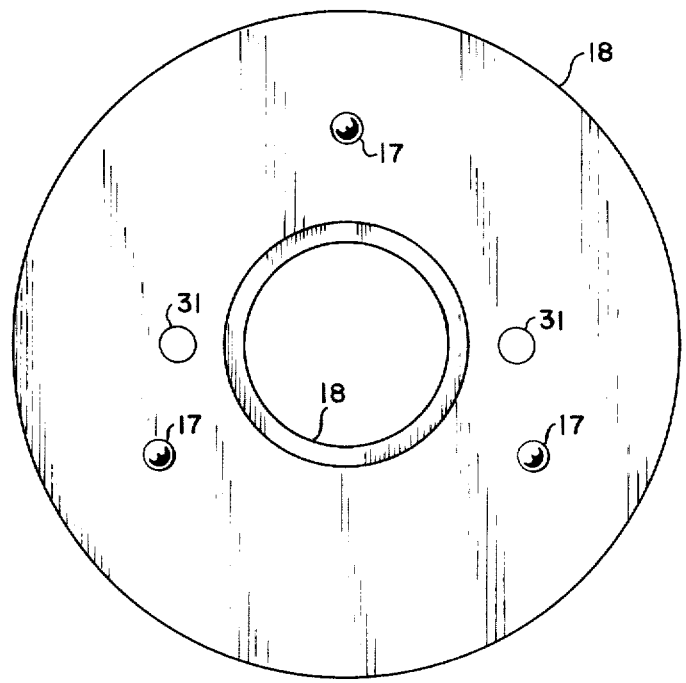
FIG. 6 is a plan interior view of the drive cylinder cap illustrating the spacer disc bearings taken substantially on line 6—6 of FIG. 1 looking in the direction of the arrows.

A series of three rollers was constructed from high carbon tooled steel drill rod stock. Each of the 24 rollers, used in conjunction with each drive cam, were constructed 1 27/64 inches in length. The large drive rollers 50 were constructed from seven-thirtysecond inches diameter rod; intermediate drive roller 51 was constructed from six-thirtysecond inches diameter rod; and the small drive roller 52 was constructed from five-thirtysecond inches diameter rod. These rollers in final assembly are placed in the device with pair of large drive rollers 50 on each side of valley spacer 49 followed by pairs of intermediate drive rollers 51 and pairs of small drive rollers 52. This results in a final arrangement with smaller diameter rollers adjacent the various drive cam lobes 22–27 and the larger drive rollers 50 adjacent the drive cam valleys 33–38. Each end of the respective drive cams 20 and 21 are constructed with a drive cam serrated surface 30. This surface is found beneficial in retaining the drive roller support disc 40 in the desired position relative to the drive cams. One surface of each drive roller support disc 40 is also preferably serrated 31 for utilization in contact with serrated surface 30 of the drive cams, the other surface of the drive roller support disc 40 are smooth. In the final assembly as illustrated in FIG. 1 spacer discs 53 are positioned in the assembly to reduce friction from the exterior surface of the various drive roller support discs 40 and the adjacent surfaces. These various spacers 53 were constructed from high carbon sheet circular in configuration of 3 7/8 inch in diameter, three-sixteenth inch and have a 1 57/64 inch hole in center. This center hole fits over and is supported by the drive cam disc support 59 projecting in axle-like fashion from each side of the first 20 and second drive cam 21. These discs in the final assembly are designated as first spacer disc 54, adjacent the ring gear disc 11, second spacer disc 55 and third spacer disc 56 and fourth spacer disc 57 are positioned intermediate the second drive roller support disc 42 and the third drive roller support disc 43. While the fifth spacer disc 58 is intermediate the fourth drive roller support disc 44 and the drive cylinder cap 13. The foregoing is designed to illustrate the general dimensions and configuration of the various components. In the prototype ring gear disc 11 and drive cylinder 12 were constructed into components welded together which was satisfactory; however, ring gear disc 11 and drive cylinder 12 might very well be of unitary construction. Standard machine shop procedures may be employed informing the various components. This is not intended to preclude molding or casting the various components. The degree of stress and the load placed on the components of this device require heat treated steel of a high degree of hardness. In the prototype the device was fitted into the housing of a conventional differential and successfully operated.

OPERATION OF THE DEVICE

Figure 7:
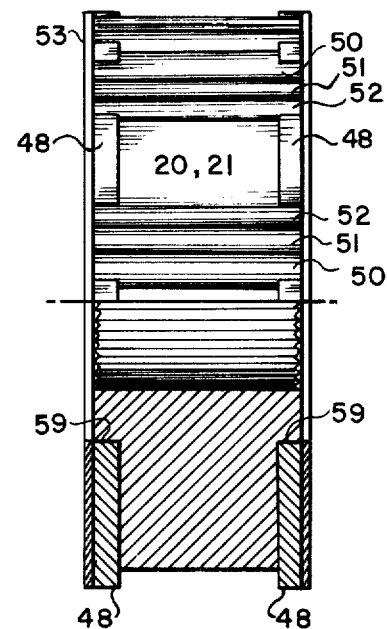
FIG. 7 is a fragmented partially sectional view of one of the two identical drive cams in an operable position together with the drive roller support disc, the drive rollers, and the spacer disc in a functional arrangement.

For a description of the operation of the device of this invention attention is particularly invited to FIGS. 1, 4 and 7. As previously stated transmission of rotary motion in this differential is accomplished by friction existing between drive cylinder 12, first drive cam 20 and second drive cam 21 through large, intermediate and small drive rollers 50, 51 and 52. In an overrun situation rotary motion from a rotating wheel through the split axle splined 39 to a drive cam 20 and 21 is transmitted through the rollers 50, 51 and 52 to the drive cylinder 12. To illustrate such an operation assume that the interior drive cam 21, FIG. 4, is driven in the counterclockwise direction at a higher rate of rotation than is the movement of drive cylinder 12. This variation in rotation results in large drive roller 50, intermediate drive rollere 51, and small drive roller 52 backing up on the respective overrun surfaces 29 of each of the drive cam lobes 22–27. This riding up of the respective rollers 50–52 causes a jam-like frictional action between the respective drive can lobes and the surface of the drive cylinder 12. This tends to rotate drive cylinder 12 through the gear train turning the engine. A concurrent function of rotating cylinder 12 tending to drive the adjacent drive cam rotating the opposite axle and wheel at the same rate of rotation as the driven wheel. In a similar overrun situation of the other wheel, each wheel with their respective drive cans 21 and 22 could tend to drive the cylinder 12 in the same direction. In the normal power transmitting situation, rotation of the ring gear (not shown) by the pinion gear (not shown) drives the ring gear disc 11 rotating drive cylinder 12. Counter-clockwise rotation of cylinder 12 of FIG. 4 causes the drive rollers 50–52 on each cam lobe 22–27 to ride up on the drive surface 28 and results in a jam-like frictional contract between the drive cam 20 or 21 and cylinder 12. The frictional contact causes the cams 20-21 to rotate the axle and attached wheel. The slippage between first drive cam 20 and second drive cam 21 and drive cylinder 12 permits a differential rate of rotation between the respective cams 20 and 21 and their attached wheels. The limited slip characteristic of the differential of this invention is accomplished by utilizing a common drive cylinder 12. The arrangements of the components in FIG. 1 tends to urge all of the interior components to rotate in the same direction at the same rate of rotation. The slippage overrun of one wheel tends to transmit the rotary motion of the drive cylinder 12 to the slower rotating drive cam 20 or 21 consequently transmitting rotary motion to the wheel having the most secure contact with the ground.

Having described the construction and operation of this device in a preferred embodiment, what is desired to be claimed is all equivalents not departing from the scope of the invention as defined in the appended claims.

I claim:
1. A differential drive mechanism comprising:
   a. an elongated drive cylinder having a first end and a second end and an inside and an outside mounted for rotation in a housing,
   b. means for rotating said drive cylinder,
   c. a first drive cam having a first side and a second side mounted for rotary motion inside said drive cylinder, said first drive cam being capable of receiving and rotating an axle in either a clockwise or counterclockwise direction,
   d. a second drive cam having a first side and a second side mounted for rotary motion inside said drive cylinder adjacent but not securely attached to said first drive cam, said second drive cam being capable of receiving and rotating an axle in either a clockwise or counter-clockwise direction,
   e. each of said drive cams further comprising equal numbers of symmetrical multiple convex arcuate drive cam lobes,
   f. the interspacing of said multiple convex arcuate drive cam lobes defining a multiplicity of drive cam valleys,
   g. a multiplicity of drive rollers having progressive dimensions positioned inside said drive cylinder adjacent each side of each valley and each drive cam lobe,
   h. said multiple drive rollers frictionally contacting a cam drive surface when said drive cylinder rotates in a clockwise direction, and conversely,
   i. said multiple drive rollers frictionally contacting a cam overrun surface when said drive cylinder is rotated in a counter-clockwise direction.
   j. a first drive roller support disc compartibly positioned in said drive cylinder adjacent the said first side of said first drive cam,
   k. a second drive roller support disc compatibly positioned inside said drive cylinder adjacent the said second side of said first drive cam,
   l. a third drive roller support disc compatibly positioned inside said drive cylinder adjacent the said first side of said second drive cam,
   m. a fourth drive roller support disc compatibly positioned inside said drive cylinder adjacent said second side of said second drive cam.
   n. said first and said second drive roller support discs rotatably supporting a multiplicity of said drive rollers adjacent the valleys of said frist drive cam, and
   o. said third and said fourth drive rollers support discs rotatably supporting a multiplicity of said drive rollers adjacent the valleys of said second drive cam.

2. The invention of claim 1 further comprising a spacer disc juxtaposed said second and said third drive roller support discs.

3. The invention of claim 1 further comprising a multiplicity of spacer discs juxtaposed said second and said third drive roller support discs.

4. The invention of claim 1 further comprising:

a a ring gear disc secured to a first end of said drive cylinder, and b. a drive cylinder cap mounted in a second end of said drive cylinder.

5. The invention of claim 4 further comprising:
a. a first spacer disc juxtaposed said ring gear disc and said first drive roller support disc, and
b. a spacer disc juxtaposed said fourth drive roller support disc and said drive cylinder cap.

6. The invention of claim 4 further comprising a multiplicity of spacer discs bearings constructed in said ring gear disc and said drive cylinder cap.

7. The invention of claim 1 further comprising a multiplicity of lubrication passages in said drive cylinder.

* * * * *